Figure 1:
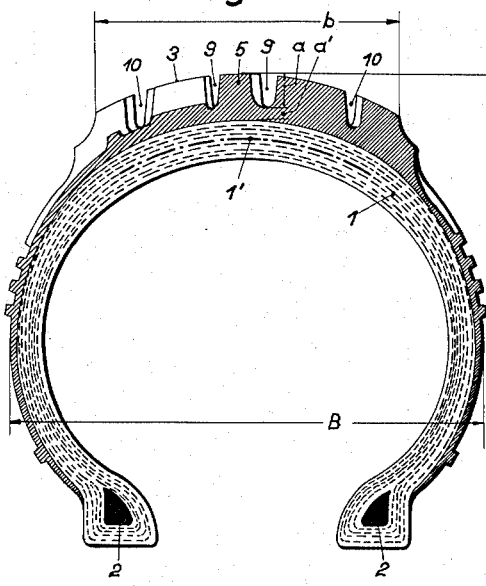

Dec. 2, 1952   A. GIEBHART   2,620,009
GIANT PNEUMATIC TIRE
Filed Feb. 23, 1950

INVENTOR
Anton Giebhart
By Watson, Cole, Grindle
   & Watson

Patented Dec. 2, 1952

2,620,009

UNITED STATES PATENT OFFICE 2,620,009

GIANT PNEUMATIC TIRE

Anton Giebhart, Baden, near Vienna, Austria, assignor to "Semperit" Österreichisch-Amerikanische Gummiwerke Aktiengesellschaft, Vienna, Austria Application February 23, 1950, Serial No. 145,732
In Austria March 18, 1949

2 Claims. (Cl. 152—209)

The invention relates to pneumatic tires having in the inflated condition an outer diameter of at least 35½", a width of at least 7½" and an anti-skid tread of a surface width of at least 5½". Such tires, which will be referred to as "giant pneumatic tires," are used on heavy motor vehicles such as buses, coaches, lorries, or trucks designed for running at high speed on metalled roads, as distinguished from tractors or the like designed for ploughed fields or other soft ground and for comparatively much lower speeds than the aforesaid road vehicles.

It is the principal object of the invention to provide a giant pneumatic tire having a life period or milage exceeding the maximum hitherto thought to be attainable by about one half.

It is another object of the invention to provide a giant pneumatic tire having an anti-skid tread of an average life period or milage equal to that of the canvas cover so as to avoid retreading of the latter.

It is also an object of the present invention to provide a giant pneumatic tire having an antiskid tread of a height substantially exceeding what has been hitherto considered to be the maximum height of about 8% of the surface width of the tread or about 1.2% of the tire diameter in the inflated condition in view of internal heating caused by the work of "kneading."

It is still another object of the invention to provide a giant pneumatic tire having an antiskid tread wherein bulky accumulations of undivided rubber masses is avoided in order to prevent excessive heating.

It is yet another object of the invention to provide giant pneumatic tire having an anti-skid tread which is dissolved into elements of a pattern affording thorough ventilation to all the said elements in order to prevent excessive heating.

It is yet another object of the invention to provide a giant pneumatic tire capable of being moulded in a bi-partite mould, i. e. not requiring a tri-partite mould for its manufacture.

Other objects will appear from the description of a typical embodiment of the invention which will be given later in this specification by way of example.

According to a main feature of the invention a giant pneumatic tire as defined hereinabove comprises an anti-skid rubber tread having a cambered surface of a curvature parallel to that of the canvas cover of the tire, to which it is vulcanized the said tread consisting of a continuous base layer and of an anti-skid pattern projecting therefrom a height of 11–20% of the surface width of the said tread and having an aggregate surface area not exceeding 75% of the overall surface area of the said tread.

Preferably the said antiskid pattern comprises a continuous central band and at least two rows of pattern blocks arranged on each side of the said band, separated therefrom and from one another by continuous circumferential recesses, the pitch of the rows of said pattern blocks adjacent the said central band amounting to .5–1% of the circumference, and the pitch of the rows of pattern blocks adjacent the edges of the tread amounting to 1–2% of the circumference.

Preferably the said continuous central band is made zig-zag shaped and has the subsidiary but not inherent feature of transverse recesses arranged at alternate reentrant corners on both sides. Such a central band contributes to the anti-skid properties of the tread while avoiding excessive accumulations of undivided rubber, and is capable of being moulded in a bi-partite mould as distinguished from a zig-zag band dissolved into transverse laminations or blocks which would require a tri-partite mould i. e. a mould divided at the edges of the anti-skid tread, in order to be capable of freeing from the mould the segments of the matrix, which extend over the whole tread surface.

The said central band is separated from the adjacent row of pattern blocks by continuous circumferential recesses and divide the individual rows of pattern blocks from one another.

In the case of a zig-zag central band, the pattern blocks of the adjacent rows have preferably roof-shaped corners jutting out towards the reentrant corners of the zig-zag band so as to define a zig-zag shaped circumferential recess between themselves and the said central band.

The said pattern blocks of the inner rows may have roof shaped corners jutting out towards the adjacent outer rows as well.

Preferably the pitch of the outer rows is twice that of the inner rows, and the blocks of the said outer rows have roof-shaped corners jutting out towards every alternate reentrant corner between two blocks of the inner rows.

Preferably the transverse recesses separating the individual pattern blocks of each row from one another are narrower in the inner rows and wider in the outer rows, where they may flare out towards the edges of the tread. Thereby an excellent ventilation of the tread is achieved, and overheating is avoided.

With these general statements of the objects and purposes of my invention I will now proceed to describe an embodiment thereof and the manner in which my invention is carried out, and it will be understood that while I have described what may be considered as a preferable embodiment of my invention, I do not limit myself to the precise conditions or proportions herein set forth, as they may be varied by those skilled in the art in accordance with the particular purposes for which they are intended and the conditions under which they are utilised.

Figure 3:
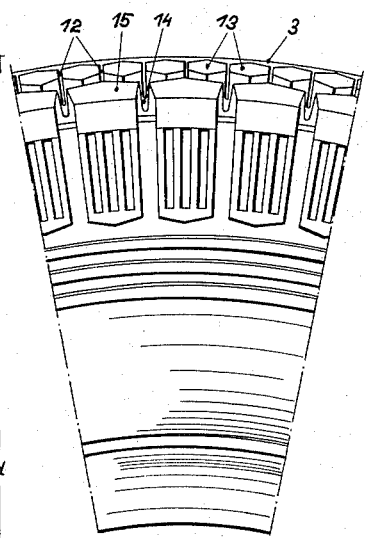
Figure 2:
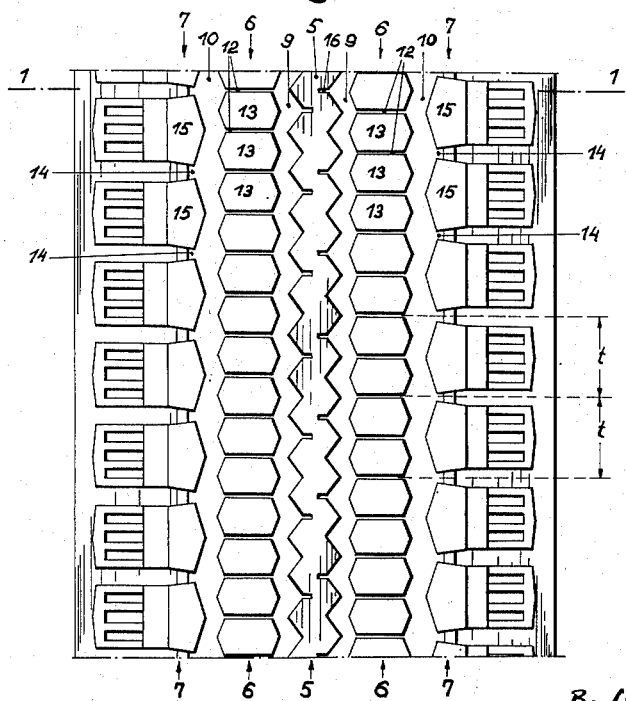

In the accompanying drawing:

Fig. 1 shows a giant pneumatic tire in cross section along the line I—I of Fig. 2, Fig. 2 shows part of the tire in plan view, and Fig. 3 shows a sector of the tire in side elevation.

The canvas cover 1 of the tire is built up of rubber impregnated cord fabric and has beads 2 on the edges and an anti-skid rubber tread 3 on top. The tread surface has a width $b$ of at least 5½". The diameter $d$ of the tire amounts in the inflated condition to at least 35½", and the width $B$ thereof to at least 7½".

The tread surface is cambered and has a curvature substantially parallel to the middle layer 1' of the canvas cover 1 in order to prevent any thickening of the rubber at the edges of the tread surface.

The anti-skid pattern provided in the tread consists of a continuous circumferential zig-zag band 5 having transverse recesses 16 at alternate reentrant corners on both sides. An inner row 6 and an outer row 7 of pattern blocks is arranged on each side of the said central band 5. A continuous circumferential recess 9 separates the central band 5 from each of the inner rows 6 of pattern blocks, and a continuous circumferential recess 10 separates each inner row 6 from the adjacent outer row 7 of pattern blocks.

Each inner row 6 is divided into individual pattern blocks 13 by comparatively narrow transverse recesses 12 which connect the circumferential recesses 9 and 10 of the respective side with one another.

Each outer row 7 is divided into individual pattern blocks 14 by comparatively wide transverse recesses 14 which flare outwards and issue on the sides of the tread into the open air whereby a good ventilation of the tread from the central band outward is secured by a system of intercommunicating circumferential and transverse channels.

While the usual thickness $a'$ of the base layer is maintained, the height of the anti-skid pattern amounts to at least 11% of the width $b$ of the tread surface, and may vary between 11 and 20% according to the size of the tire, which corresponds to at least 2-4% of the outer diameter $d$ of the tire.

The total area of the recesses 9, 10, 12, and 14 amounts to at least 25% of the overall tread surface area, i. e. the aggregate area of the central band 5 and of the pattern blocks 13 and 15 amounts to less than 75% of the said overall area.

The pitch of the anti-skid pattern is comparatively small in relation to the circumference of the tire; it amounts to .5-1% of the circumference for the inner row 6 of pattern blocks 13 and to 1-2% for the outer rows 7 of pattern blocks 15. One pattern block 15 is thus associated with two pattern blocks 13.

As will be seen in Fig. 2, the inner and outer side faces of the pattern blocks 13 are roof-shaped, and so are the inner side faces of the pattern blocks 15. The corners at the inner side faces of the pattern blocks 13 jut out towards the reentrant corners of the central zig-zag band 5 whereby the circumferential recess 9 is also given a zig-zag shape. The corners of the pattern blocks 15 jut out towards alternate reentrant corners formed between adjacent blocks 13 of the inner rows 6 at the outer side faces thereof, while the other alternate reentrant corners of the inner row 6 are in juxtaposition with the flaring transverse recesses 14 between the pattern blocks 15.

Thereby the tread is dissolved into a most compact pattern of anti-skid excrescences 5, 13, 15 enclosing a maximum area of recesses 9, 10, 12, 14 between one another, whereby an excellent anti-skid effect combined with very good ventilation of the tread is achieved.

What I claim is:

1. In or for a giant pneumatic tire having in the inflated condition an outer diameter of at least 35½" and a width of at least 7½" an anti-skid rubber tread of a surface width of at least 5½" comprising a continuous base layer, a continuous central zig-zag shaped band having transverse recesses at alternate reentrant corners, an inner row of pattern blocks arranged on each side of the said central band separated therefrom by continuous circumferential recesses, the pattern blocks of the said inner rows having a pitch of .5 to 1% of the circumference and being separated from one another by comparatively narrow transverse recesses, an outer row of pattern blocks arranged on each edge of the said tread, separated from the adjacent inner row of pattern blocks by a continuous circumferential recess, the pattern blocks of said outer rows having a pitch of 1 to 2% of the circumference and being separated from one another by comparatively wide transverse recesses, flaring outward, the said central band and inner and outer pattern blocks projecting from the said base layer a height of 11-20% of the surface width of the said tread and having an aggregate surface area not exceeding 75% of the overall surface area of the said tread.

2. An anti-skid rubber tread according to claim 1, the pitch of the pattern blocks of the inner rows being half of the pitch of the outer rows and the pattern blocks of the inner rows having roof-shaped corners jutting out toward the outer rows, and the pattern blocks of the outer rows having roof-shaped corners jutting out toward alternate reentrant corners between blocks of said inner rows, said transverse recesses between pattern blocks of the outer rows being in alignment with transverse recesses between the pattern blocks of the inner rows.

ANTON GIEBHART.

REFERENCES CITED

The following references are of record in the file of this patent:

UNITED STATES PATENTS

| Number | Name | Date |
| --- | --- | --- |
| 1,201,744 | Kremer | Oct. 17, 1916 |
| 1,478,833 | O'Brien | Dec. 25, 1923 |
| 2,006,197 | Ewart | June 25, 1935 |
| 2,056,131 | Brittain | Sept. 29, 1936 |
| 2,432,847 | Woods | Dec. 16, 1947 |

FOREIGN PATENTS

| Number | Country | Date |
| --- | --- | --- |
| 110,397 | Austria | Apr. 16, 1940 |